L. GASSER.
CORN HARVESTER.
APPLICATION FILED MAR. 3, 1908.
906,868. Patented Dec. 15, 1908.
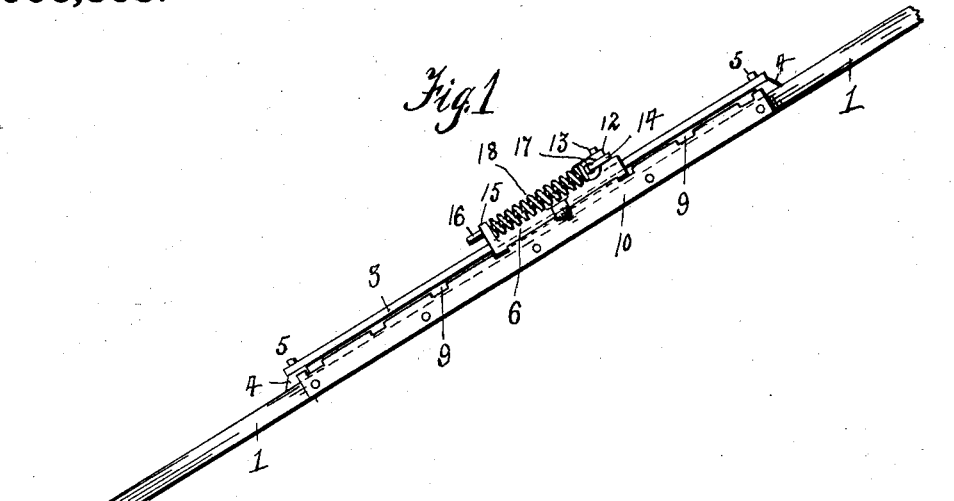
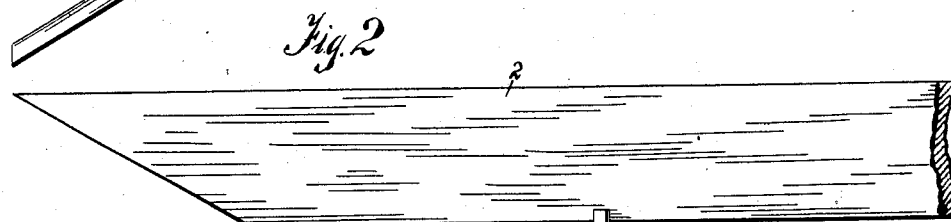
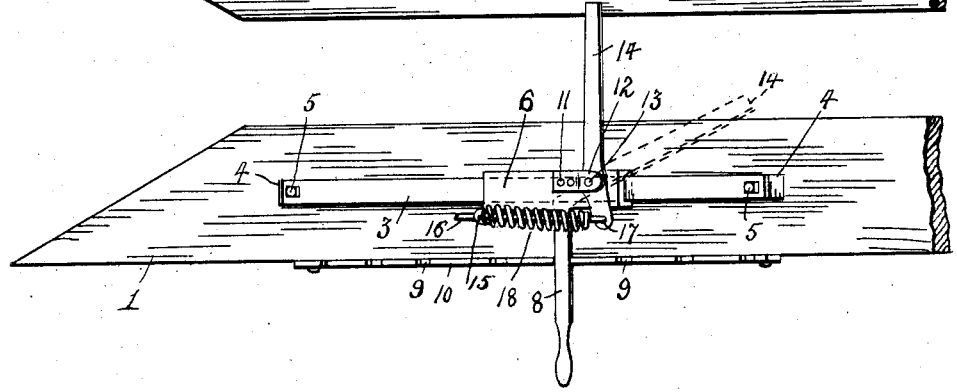
Witnesses.
M. R. Meacham.
C. N. Woodward
Leonhard Gasser,
Inventor,
By
Atty.

UNITED STATES PATENT OFFICE.

LEONHARD GASSER, OF PRAIRIE DU SAC, WISCONSIN.

CORN-HARVESTER.

No. 906,868.　　　Specification of Letters Patent.　　　Patented Dec. 15, 1908.

Application filed March 3, 1908. Serial No. 419,035.

*To all whom it may concern:*

Be it known that I, LEONHARD GASSER, a citizen of the United States, residing at Prairie du Sac, in the county of Sauk and State of Wisconsin, have invented certain new and useful Improvements in Corn-Harvesters, of which the following is a specification.

This invention relates to corn harvesters.

In the harvesting and binding of corn the machine is provided with what are known as conveyer prongs or boards which coöperate with the cutting mechanism and which convey or guide the stalks upwardly in upright or vertical position to the deck of the binding mechanism, and as the butt ends of the stalks are naturally heavier than the opposite ends thereof there is more or less difficulty experienced in properly feeding the stalks to the binder.

It is therefore an object of my invention to retard the upper ends of the stalks as they pass through or between the conveyer prongs or boards of the machine so that the butt ends of the stalks may be fed slightly in advance of the upper end thereof to the binding mechanism.

Another object of my invention resides in the provision of means associated with the conveyer prongs or boards and including a yieldable element arranged in the path of feed to the binding mechanism, which element is actuated by the stalks themselves and which under pressure incident to the feed of the stalks will swing out of the path of feed to permit the stalks to be fed to the deck of the binding mechanism with the butt ends of the stalks slightly in advance of the upper ends thereof.

With the above and other objects in view, the invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings:—Figure 1 is a side elevation of one of the conveyer prongs of a corn harvester, with my invention attached thereto. Fig. 2 is a plan view of the conveyer prongs or boards with my invention attached to one of them. Fig. 3 is an enlarged detail perspective view of the sleeve member of my invention.

Referring now more particularly to the accompanying drawings in which I illustrate only that part of a corn harvesting machine which is necessary to illustrate and describe the operation of my invention, the reference characters 1 and 2 indicate the conveyer prongs or boards of common form usually associated with corn harvesting machines.

Disposed upon the prong 1 is a strip 3 which is spaced from the prong 1 by virtue of the spacing blocks 4 disposed at each end thereof and which, with the strip 3, are secured to the prong 1, by means of the bolts or other suitable elements 5.

Slidably mounted upon the strip 3 is a sleeve 6 which has a laterally directed socket 7 in which is fitted a handle member 8, which handle member 8 is designed to engage interchangeably in the notches 9 of a plate 10 secured in any suitable manner to the outer edge of the prong 1, whereby the positioning of the handle member 8 in any of the notches 9 of the plate 10 will effect an adjustment of the sleeve 6 upon the strip 3, which adjustment is provided for because it is sometimes expedient to adjust my improved device for the accommodation of short or long stalks.

Secured by means of suitable fastenings 11 to the top of the sleeve 6 is a plate 12 which has one end directed upwardly in spaced relation to the sleeve 6 and between which latter and the upwardly directed end of the plate 12 is pivoted by means of a suitable pivot pin 13, an arm 14 which is designed to extend across the path of feed between the conveyer prongs for engagement by the upper ends of the stalks to retard the latter in their feed through the prongs so that the butt ends of the stalks may pass to the binding mechanism slightly in advance of the upper ends of the stalks.

To hold the arm 14 normally across the path of feed between the prongs, I provide the sleeve 6 with a lug 15 having a perforation for the slidable reception of a rod 16 which has connection at one end with the inner end of the arm 14 as indicated at 17, and upon this rod 16 I dispose a helical or other spring 18 which may be compressed between the lug 15 and the inner end of the rod 16 when the arm 14 is thrown to the dotted line position indicated in Fig. 2, when the upper ends of the stalks exert releasing pressure upon the latter. When the stalks have been released from engagement with the arm 14 the latter returns automatically to its normal position indicated in full lines in Fig. 2 incident to the expansion of the spring 18.

From the foregoing it will be understood that when the machine is harvesting long or short stalks that my invention may be adjusted accordingly upon the conveyer prongs upon which it is mounted and that incident to the usual feeding mechanism associated with the conveyer prongs, the butt ends will be caused to travel to the deck of the binding mechanism slightly in advance of the upper ends thereof because the upper ends of the stalks are necessarily retarded momentarily by engagement with the spring controlled retarding arm 14.

My invention is exceedingly simple, inexpensive, durable and efficient in operation, and owing to its organization of elements, being constructed in the manner suggested by me, it results that my invention is readily attached or secured to the common form of conveyer prongs or boards and that, therefore, my invention may be manufactured entirely separate from the prongs themselves.

What is claimed is:

1. The combination with the conveyer prongs of a corn harvesting machine, of a strip secured to one of the prongs, a notched plate secured to the same prong, a hollow member slidably mounted upon said strip, an element projecting from the hollow member and formed for interchangeable engagement in the notches of said plate, whereby the hollow member may be secured in adjusted positions upon said strip, an arm pivotally mounted upon said hollow member and projecting across the space between the prongs for engagement by the upper ends of the stalks to retard the movement of the latter at their upper ends and permit the butt ends of the stalks to continue through the conveyer prongs in advance of the upper ends thereof, and a yieldable element having connection with said arm to hold it against the action of the stalks momentarily and to return said arm to its normal position when the stalks have been released from engagement therewith.

2. The combination with the conveyer prongs of a corn harvesting machine, of a strip secured to one of the prongs, a notched plate secured to the same prong, a hollow member slidably mounted upon said strip, an element projecting from the hollow member and formed for interchangeable engagement in the notches of said plate, whereby the hollow member may be secured in adjusted positions upon said strip, and an arm pivotally mounted upon said hollow member and projecting across the space between the prongs for engagement by the upper ends and permit the butt ends of the stalks to continue through the conveyer prongs in advance of the upper ends thereof.

3. The combination with a corn harvesting machine provided with conveyer prongs, of means constructed and arranged in the path of feed through the conveyer prongs intermediate the ends thereof for engagement by the upper ends of the stalks to retard momentarily the progress of the upper ends of the stalks and permit of the butt ends of the latter to continue through the prongs in advance of the upper ends of the stalks.

4. The combination with the conveyer prongs of a corn harvesting machine, of spring controlled means constructed and arranged in the path of the feed through the conveyer prongs intermediate the ends thereof for engagement by the upper ends of the stalks to retard momentarily the progress of the upper ends of the stalks and permit of the butt ends of the latter to continue through the prongs in advance of the upper ends of the stalks.

5. The combination with the conveyer prongs of a corn harvesting machine, of a spring controlled arm extended across the path of feed through the prongs intermediate the ends thereof for engagement by the upper ends of the stalks to retard the movement of the upper ends of the stalks and permit of the butt ends of the latter to continue through the prongs in advance of the upper ends of the stalks.

6. The combination with the conveyer prongs of a corn harvesting machine, of means mounted upon one of the prongs and having an element extended across the path of feed through the prongs for engagement by the upper ends of the stalks to momentarily retard the movement of the upper ends of the stalks to permit of the butt ends of the latter to continue through the prongs slightly in advance of the upper ends of the stalks, and means for adjusting said first mentioned means upon the prongs.

7. A device of the character described comprising a supporting strip, a sleeve arranged for sliding movement upon the strip, an arm pivotally mounted upon said sleeve, and a spring having connection with the arm and means independent of the arm for adjusting the sleeve.

8. A device of the character described comprising a supporting strip, a sleeve arranged for sliding movement upon said strip and having a laterally projecting socket, an operating handle member secured in said socket, the sleeve also having a perforated lug, an arm pivotally mounted upon the sleeve, a rod connected to the inner end of said arm and projecting through the perforation of said lug, and a spring mounted upon said rod.

In testimony whereof I affix my signature, in presence of two witnesses.

LEONHARD GASSER.

Witnesses:
FLORIAN GASSER,
ALEX. McGINNIS.